Aug. 13, 1929.　　　P. GAMBAROTTA　　　1,724,468
SPEED INDICATING APPARATUS
Filed Dec. 7, 1926　　　6 Sheets-Sheet 1

Aug. 13, 1929.    P. GAMBAROTTA    1,724,468
SPEED INDICATING APPARATUS
Filed Dec. 7, 1926    6 Sheets-Sheet 5

Aug. 13, 1929.   P. GAMBAROTTA   1,724,468
SPEED INDICATING APPARATUS
Filed Dec. 7, 1926   6 Sheets-Sheet 6

Patented Aug. 13, 1929.

1,724,468

UNITED STATES PATENT OFFICE.

PIERO GAMBAROTTA, OF GENOA, ITALY.

SPEED-INDICATING APPARATUS.

Application filed December 7, 1926, Serial No. 153,174, and in Italy December 12, 1925.

This invention relates to apparatus for indicating the speed of vehicles and other machines whatever be their mode of actuation, as well as the velocity of the wind or of a fluid, such as water, and may be said to comprise a development of the apparatus forming the subject matter of my prior Patent No. 1,596,345 dated August 17th, 1926. The apparatus described in said patent comprises an indicating ball having means for rotating the same driven by a vehicle wheel or some other moving part of a machine, the driving means being normally engaged with the indicating ball, but being adapted to release the ball when the vehicle or machine exceeds a certain speed, the indicating ball then coming to a standstill to show that the speed for which the apparatus is set has been surpassed.

One of the objects of the present invention is to provide means which will prevent the ball or balls of the apparatus from signalling the normal speed after an excessive speed has been signalled (even if the speed of the machine or vehicle has been lowered in the meantime below the limit for which the ball or balls are set or the machine or vehicle has been stopped altogether) until the driver has adjusted the apparatus to restore the mechanism of each ball to its initial condition.

A second object is to fit each ball of the apparatus with a device which will indicate in a permanent way how many times and how long each ball has signalled a speed exceeding the speed for which the device controlling the ball has been set.

A third object is to provide means for indicating, even in the dark, which of the balls are running and which are at rest.

A fourth object consists in arranging the apparatus so that a single ball shall be capable of controlling various speeds; this for the sake of a pleasing appearance as well as the requirement of less space.

A fifth object contemplates the provision of devices capable of securing a different driving of the ball by a centrifugal governor than is obtained in the apparatus according to my prior Patent No. 1,596,345 above referred to.

A sixth object resides in the provision of devices capable of forewarning the driver of the nearing of the speed for which each ball is set to give the excessive speed signal, in order that he may control the vehicle accordingly.

A seventh object is to provide novel driving means for the usual ball or indicating body consisting of a disc connected to the machine or vehicle wheel and a friction wheel actuated by the disk upon the rotation of the vehicle wheel and arranged in a special manner on the spindle of a centrifugal governor which drives the ball.

It is to be understood that these objects are applicable to apparatus having a single ball and to apparatus having several balls, and that they are effected with similar means both in the first type of apparatus with balls arranged to rotate during the normal speed periods and to remain at rest during the excessive speed periods according to Patent No. 1,596,345 and in the second type of apparatus working in the reverse manner.

The following description refers principally to devices capable of realizing these objects in the first type of apparatus, but it will be understood that similar devices are also capable of attaining these objects in the second type of apparatus.

In order to realize the first object, the centrifugal governor is fitted with a device which is adapted to lock the governor in position when it has taken up that position in which it causes the ball to indicate excessive speed, and the governor cannot be restored to its initial position until the machine or vehicle has been stopped and the driver has manipulated the device by hand to effect the release and restoration to starting position of the governor.

The second object is attained by providing each ball with a progressive counter having numerals, non-reversible and visible from the outside and with a driving gear which causes the counter to advance by one number at each revolution or set of revolutions made at excessive speed by the corresponding ball. The ratio of transmission being known, the counter numerals and ball revolutions can obviously be expressed in terms of revolutions or of miles per hours running at excessive speed whether it be a stationary machine or a vehicle.

The third object is secured by providing each ball with an incandescent lamp or the like colored similarly to the respective ball, in order to distinguish it from the others, as well as a device by means of which the lamp is rendered visible from the outside during the normal speed and is rendered invisible during the excessive speed periods.

The fourth object is realized by providing the apparatus with a change-speed mechanism suitably connected to means showing, even at a distance and in the dark as well as in the light, the position in which the change-speed mechanism is set, and consequently the velocity that the apparatus is capable of controlling at the time.

The fifth object is realized by providing on the inertia masses of the governor, rollers having an elastic or springy pivotal movement, the rollers being adapted to engage the indicating body or to become disengaged therefrom when a certain speed is exceeded. This object can also be attained by causing the said masses to work through the intermediary of a soft material, such as rubber.

The sixth object is realized by associating with each main ball a fore-warning device giving a suitable signal (for instance an optical or an acoustic signal) as soon as the machine or engine speed has nearly attained the value for which the corresponding main ball is set.

The device concerned may consist for instance of a ball (fore-warning ball) larger or smaller than the main ball. The drive, painting, etc. of the fore-warning ball is similar to that of the main ball and the arrangement is such as to cause the fore-warning ball to stop or start revolving (according to the type of drive) when the speed of the apparatus is a little less than the speed for which the corresponding main ball is set; in order to warn the driver that he is in the vicinity of the excessive speed considered. The fore-warning ball may be arranged at the top or at any other place on the apparatus.

The same object may also be achieved by suitably painting the top cap of the ball or the ball itself or by arranging some other means at the outside of the ball, so that the driver can readily ascertain the various positions occupied at any time by the inertia masses of the centrifugal governor. The arrangement is such that the indication is conspicuous and gives as accurate an idea as possible of the rotation speed of the apparatus, and the driver, aided by habit and experience, can determine the approach of the excessive speed.

According to the seventh object, means are provided for permitting the driver to adjust the driving mechanism to cause the ball to indicate several predetermined angular, peripheral, or hourly velocities of the machine or vehicle by conveniently adjusting the position of a friction wheel relative to the centre of a friction disc.

Moreover, means are provided which permit the control of any of the predetermined machine or vehicle velocities as above, no matter what the diameter of the machine or vehicle wheel may be.

The invention is illustrated, by way of example only, in the accompanying drawings.

Fig. 1 is a vertical section through the centre plane, showing an apparatus with a single main ball of torus-cylindrical shape, the ball drive being designed in accordance with the first type of apparatus mentioned, and the apparatus being provided with an embodiment of each of the first six objects referred to.

It should be understood that the form and constructive details, provided they are capable of realizing the objects of this invention, may differ from those shown and described without departing from the spirit and scope of the invention.

In general the apparatus shown in Figs. 1 to 4 comprises a ball or indicating body $n$ and a governor $b$ connected with a moving part of a machine, such as the wheel of a vehicle (not shown), the governor having inertia masses 9 pulled inward by yieldable means so that they normally engage a circular flange 48 of the indicating body. As long as the machine or vehicle runs below a predetermined speed the revolving inertia masses 9 remain in engagement with the flange 48 and carry the indicating body along with them. But if this speed is exceeded the inertia masses leave the flange 48 and the indicating body thereupon stops.

Figures 2, 4:
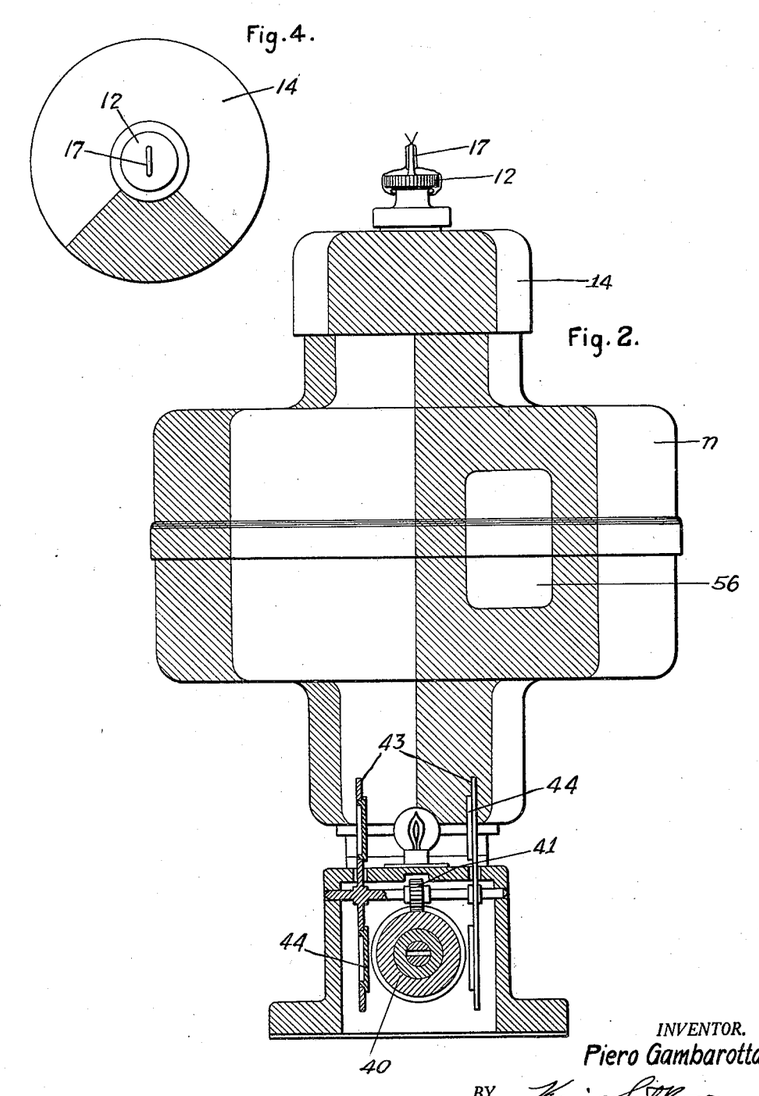
Fig. 2 is a side view of the apparatus according to Fig. 1.
Fig. 4 shows the top cap of the main ball in Fig. 2 as seen from above.

The indicating body is conspicuously colored, as shown in Fig. 2, so that its stationary or rotating condition can easily be detected.

Figure 1:
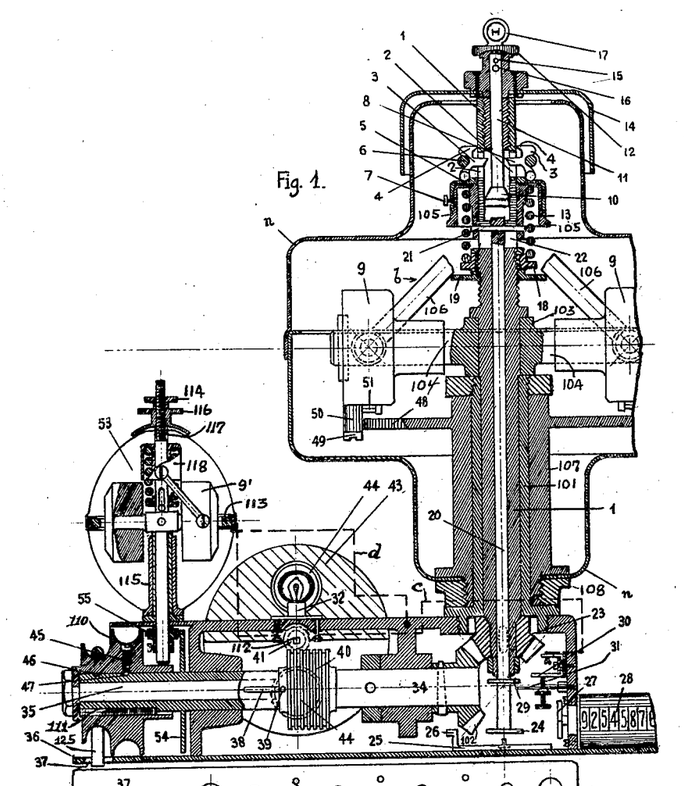

An alternative form of connection between the indicating body and governor is shown in connection with the ball 53 of Fig. 1. In this case the ball is normally stationary and is engaged and carried along by the inertia masses 9' when the latter exceed a predetermined speed of rotation. Rotation of the ball therefore indicates excessive speed.

Proceeding now to the detail construction of the apparatus shown in Figs 1 to 4 it will be seen that a hollow shaft or spindle 1 is mounted in a sleeve 101 and the shaft 1 is provided at its lower end with a bevel gear 23 which meshes with a similar gear 102 secured to a drive shaft 34. The shaft 34 is driven in a manner presently to be described from a vehicle wheel or other moving part of a machine. Above the sleeve 101 a collar 103 having radial arms 104 is secured to the shaft 1. A portion of shaft 1 above the collar 103 is threaded to receive a flanged nut 18 and lock nut 19 and above these is slidably mounted a socket 105. The motion of socket 105 is limited by a pin 21 extending through elongated slots 22 in shaft 1. A spring 13 inserted between socket 105 and nut 18 urges them apart. Inertia masses 9 are slidably mounted upon arms 104 of collar 103 and are connected to socket 105 by links 106.

A hub 107 is rotatably mounted upon the sleeve 101 and to this hub a ball or indicating body $n$ is secured by means of a nut 108. The hub 107 has a toothed flange 48 adapted to be engaged by toothed rollers 50 pivoted upon extensions 49 of the inertia masses 9. Rotation of the rollers 50 is resisted by spring detents 51. When the drive shaft 34 begins to rotate the shaft 1, governor $b$ is also rotated and the indicating body $n$ is carried along by rollers 50 engaging flange 48. As the speed of rotation increases the inertia masses 9 tend to move outward by centrifugal force, pulling the socket 105 down against the action of spring 13. When a certain speed is exceeded which is determined by the tension of spring 13 the rollers 50 leave the flange 48 and the indicating body comes to a standstill. The tension of spring 13 can be adjusted by means of nut 18 and lock nut 19.

The means for attaining the first object as illustrated, by way of example, in Figs. 1 to 4 of the drawings, is as follows:

The hollow shaft 1 has two apertures 2 formed in its walls near the top of the shaft. On cover 5 of the governor socket 105 are pivotally mounted pawls 3 having tips 4 adapted to engage the top edges of the apertures 2. A spring ring 6 always tends to force the pawls 3 into contact with the shaft 1. The cover 5 is screwed on the governor socket so as to permit the adjustment of the pawls 3 in a higher or lower position as may be required, the cover 5 after this adjustment being fixed in place by means of a set-screw. At the instant the governor socket 105 moves down sufficiently to permit the rollers 50 to disengage from the flange 48, the tips 4 of the pawls 3 slip into the apertures 2 and prevent the socket from rising when the speed is decreased.

Under these conditions the governor socket (and therewith also the governor masses) are prevented from returning into their initial position and the centrifugal governor remains open, that is to say the corresponding ball continues to remain in the condition of excessive speed indication even if the main shaft of the apparatus has slowed down or come to a standstill.

In order to restore the governor socket, the governor, and the ball to their initial position, the pawls 3 are provided with shanks 8 projecting into the apertures 2 and a rod 11 having a cone 10 adjacent the shanks 8 is slidably mounted within the shaft 1. By means of a knurled knob 12 on rod 11, the driver (either direct or from a distance) can raise the cone 10 and force the shanks 8 of the pawls 3 apart thereby releasing the tips 4 from the apertures 2. The governor socket will then be free to return to its initial position under the action of the spring 13, and the governor masses 9 are free to move toward each other, the ball now being in condition for indicating the normal speed again.

The knurled knob 12 is secured to the top cap 14. The shape of the cap as well as that of the upper portion of the ball is so designed as to prevent foreign bodies from getting inside the ball, or the ball being tampered with.

The knob 12 is fastened to rod 11 by a pin 15 inserted into the upper hole shown. The lower hole 16 is intended for a sealing wire, the two ends of which are united in a lead seal 17 placed in the ring of the knob 12 for the purpose of preventing the apparatus from being opened by unauthorized persons.

The means for carrying out the second object, shown by way of example in Fig. 1, comprises a rod 20 made fast with the governor socket by the pin 21 traversing the apertures 22 in the shaft 1. The rod 20 occupies the whole lower length of the shaft bore and projects a certain distance below the bevel pinion 23. The rod 20 moves up and down in accordance with the movement of the governor socket, and in agreement with the indications of the ball. The rod 20 also revolves with shaft 1.

When the excessive speed for which the device is set has been reached the governor masses 9 move outwardly and the ball is disconnected from its driving means. Upon this movement of the governor masses 9, the governor socket 105 is lowered together with rod 20 and an enlargement 24 on the bottom of rod 20 engages a member 25 pivoted to the base of the apparatus co-axially with shaft 1. Member 25 will then be entrained by the rod 20 and revolve with it and the shaft 1 as long as rod 20 remains lowered into engagement therewith; while the ball will remain stationary. If the ball is driven by the converse system, that is, converse to the system embodied in Fig. 1, it will revolve during the time it signals excessive speed. Member 25 has a projection 26, which at every revolution of member 25, strikes the blades of a blade-wheel 27 fixed to the spindle of a counter 28. It will be seen that at every revolution (or set of revolutions according to the type of counter) of the projection 26 and shaft 1, the counter will advance by a number, and the number will correspond to the degree of speed excess and to its duration in distance and time.

When the governor masses 9 move toward each other and the governor socket 105 as a result is raised, the enlargement 24 of the rod 20 will also rise and become disengaged from member 25. Member 25 will now come to position of rest along with counter wheel 27 and remain there during the time normal speed is indicated by the ball concerned.

Figure 10:
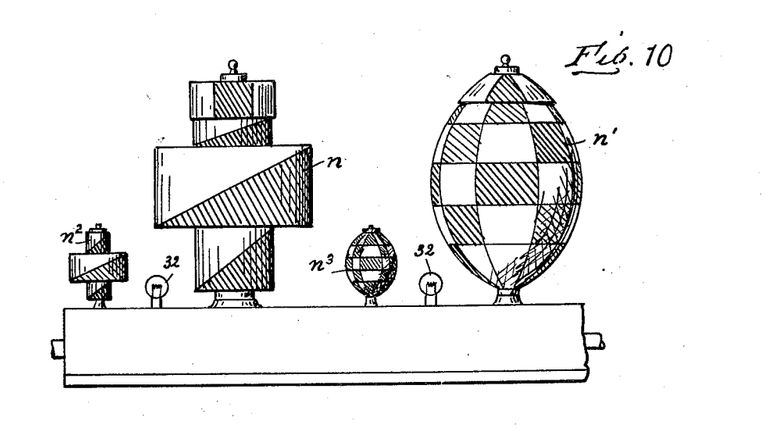
Fig. 10 is a plan view of an apparatus having a plurality of main balls for controlling different speeds, a corresponding number of fore-warning balls, and an indicating lamp for each main ball.

Fig. 10 illustrates an apparatus of this kind fitted with several balls. Each indicating ball, $n$ and $n'$, is provided with a fore-warning device, $n^2$ and $n^3$ respectively, and an indicating lamp 32. A clutch of known design may be provided on the main shaft of the apparatus which will permit the selectively bringing into engagement of the counters, so that the proper one will be engaged at the determined time.

In carrying out the third object, shown by way of example in Fig. 1, the rod 20 is provided with a flange 29 which, when the rod is lowered, strikes the end of a spring plate 31 and causes it to bend downwardly. When the rod 20 is in raised position and normal speed is indicated by the ball, the plate 31 by means of an adjustable contact carried by it, engages with an insulated contact plate 30, and an electric circuit having a lamp 32 is thereby closed. Therefore in this closed position of the circuit the lamp 32 will burn. When the predetermined excessive speed has been reached, rod 20 and its flange 29 are lowered, and at the same time the contact between plates 30 and 31 is broken and the lamp 32 goes out as the plate 31 is bent downwardly. Not until the rod 20 is raised to its initial position and the ball again indicates normal speed, will the lamp be switched-in and burn again.

In an apparatus having several balls, as shown in Fig. 10, a similarly operated and suitably colored lamp is provided for each ball.

The lamp 32 in this example is arranged on the base of the apparatus in a position depending on certain factors hereinafter mentioned. All connections are made inside the base, which afterwards is sealed by passing through holes 33 a wire that serves to secure the apparatus on the machine or vehicle concerned in order to prevent its being removed or replaced by another apparatus. The diagram of the electric connections is indicated in the drawing by the dotted lines $c$ and $d$.

Figure 11:
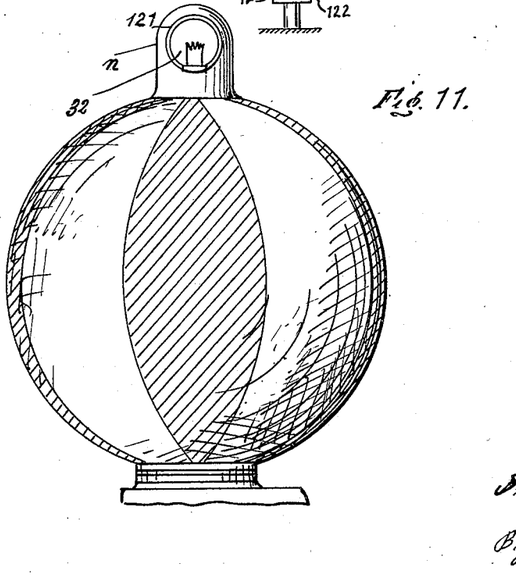
Fig. 11 shows a ball having a lamp arranged within it.
Figure 12:
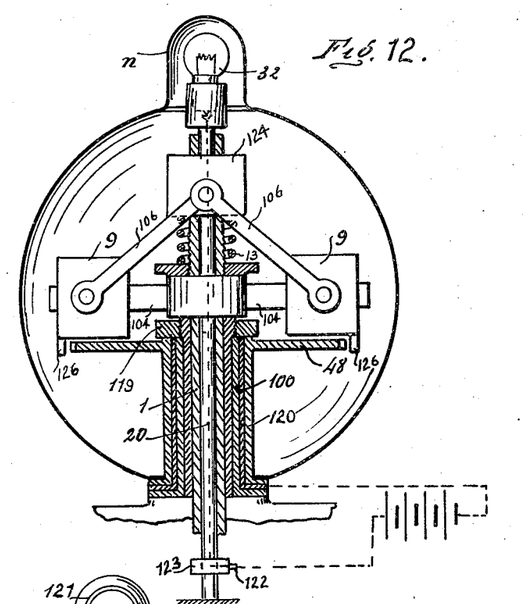
Fig. 12 is a sectional view of Fig. 11 and shows the electric circuit for the lamp and the insulation of the ball.
Figure 13:
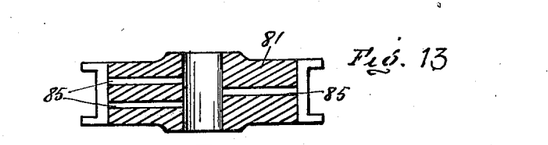
Fig. 13 is a central section of a modification of the friction wheel shown in Fig. 6.
Figure 14:
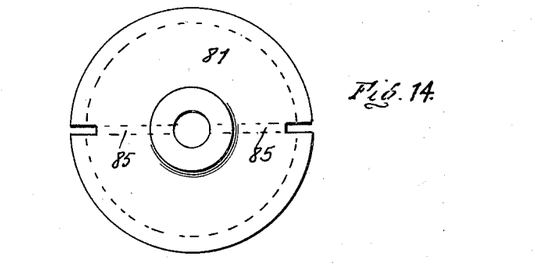
Fig. 14 is a top view of friction wheel shown in Fig. 13.

The third object might also be realized by an apparatus having the lamp arranged within the ball as in Figs. 11 and 12, the ball having windows so that the lamp may be seen from without. In this case the driving of the ball is substantially the same as in my Patent, No. 1,596,345. The ball is insulated from the apparatus by sleeve 100 and nut 119, both of which are of insulating material. This embodiment is illustrated in Fig. 12. One pole of the battery is connected to brush 122 making contact with commutator 123, the latter in turn being connected by a wire running through rod 20 with one terminal of lamp 32. The other terminal makes a contact with the rod 20 and the circuit from rod 20 is through weight 124, links 106, governor masses 9 and appendices 126. The other pole of the battery is connected to auxiliary sleeve 120. The circuit from sleeve 120 is through the ball and disc 48. It can now be seen that the circuit containing the lamp 32 and battery will be closed when appendices 126 of masses 9 and disc 48 come into contact with each other. The movement of the governor masses 9 inwardly and outwardly causes the circuit to be closed and opened accordingly.

Figure 3:
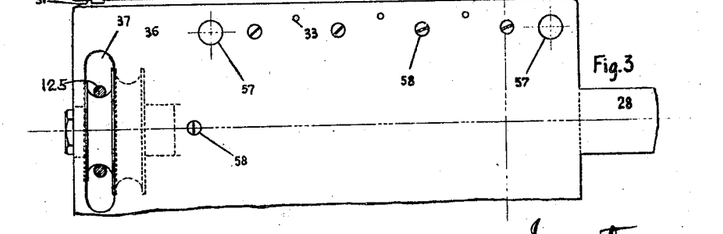
Fig. 3 shows the base of the apparatus as seen from the underside.

Means for attaining the fourth object are illustrated in Figs. 1, 2 and 3 which, by way of example, refer to a single-ball apparatus capable of controlling two speeds. Single ball apparatus might be constructed on the same principle which will be capable of controlling more than two speeds. In the form shown, the outer end of the horizontal shaft 34 carries a set of grooved pulleys 110 (two pulleys being shown formed integrally), the set being non-rotatably mounted on shaft 34 but axially slidable thereon along a spline 111 provided on the shaft. The outer portion of the shaft 34 is hollow in order to receive a rod 35 which is rigidly connected to the pulleys. The pulleys are driven from the machine or vehicle wheel by means of a belt 125 so that, once the tension of the spring 13 has been adjusted, if the belt be engaged with the smaller pulley, the critical speed of the centrifugal governor (corresponding to the indication of excessive speed by the ball and to the indications considered in the other objects) will be attained when the machine or vehicle speed is proportionately lower than would be necessary if the belt were engaged with the larger pulley.

The base 36 has an aperture 37 through which the pulley belt can just pass. As the aperture 37 is only as wide as one pulley groove, it follows that there will be only one position into which either of the pulleys must necessarily be brought in order to be conveniently actuated by the belt. Accordingly the driver, in order to put in operation a given speed, is obliged to slide the whole pulley block. The block may be moved by any suitable means. As the latter means does not constitute a part of this invention it is not illustrated. Upon the sliding of the pulley an indication observable at a distance will be made of the speed that has been engaged. The position of two discs 43 will give this indication.

In this example rod 35 is rigidly connected to the pulley block 110 and to the grooved cylindrical member 40 by means of a pin 39 projecting through longitudinal slots 38 formed in the walls of the shaft 34. An axial movement of rod 35 therefore results in a corresponding movement of member 40 with relation to shaft 34. Member 40 is provided with alternate grooves and ribs equal in thickness and profile to the teeth and tooth-spaces of a gear wheel 41 with which they engage. The spindle 112 of this gear wheel 41 is at right angles to the shaft 34. Therefore it is clear that wheel 41 is actuated by member 40 upon the movement of the latter along its axis, member 40 being slidable along shaft 34. Two discs 43 mounted on spindle 112 are simultaneously driven upon the actuation of wheel 41. Both sides of each disc 43 are painted, one-half of each side being painted with one color and the other half with another color. On the diameter lying at right angles to the diameter separating the two colors, the discs have two holes 44 fitted with a transparent screen colored in the same manner as the disc half in which the hole is formed. A little more than one half of the two discs is concealed within the lower part of the apparatus.

The amount of sliding of the pulley block required to control either of the two speeds considered in the present case and the consequent amount of sliding of the member 40 are so calculated as to cause half a revolution of the discs 43. It follows that when one pulley is engaged by the belt, the disc zones colored in one way will appear at the outside, and when the other pulley is engaged by the belt the zones painted with the other color will be visible. The lamp 32 is arranged between the two discs, facing the position occupied by the holes 44 when the corresponding speed is engaged. As a consequence the color of the light of the lamp in the dark will be that of the halves of the discs indicating the speed that has been connected up.

A spring-loaded pin or detent 45 is adapted to engage the notches 46—47 formed in shaft 34 and to maintain the pulley block and the discs 43, positively connected to the former, in the desired position, once the displacement has been effected.

In the same manner the apparatus can be arranged to control more than two speeds with a single ball by the use of discs painted with three or more colors, three or more pulleys, three or more screens, etc.

The change-speed mechanism might also be based on the degree of compression of the spring 13 of the centrifugal governor, the adjustment of the lock nuts 18—19 causing a change in the compression of the spring 13 and a corresponding change in the excessive speed to be signalled.

With reference to the fifth object, in the embodiment shown, by way of example in Fig. 1, the shaped plate or ring of the aforesaid prior patent is replaced by a toothed disc 48 (or toothed rim) and the extensions 49 are provided with rollers 50, the toothing of which is the same as that of the disc 48 with which the rollers 50 mesh. The rollers are braked by a spring plate 51, one end of which is fixed to the respective governor mass 9 and the other end of which engages the roller's teeth. The alternate system of drive is also illustrated in Fig. 1 and is provided for the forewarning ball 53. In this case the ball takes up the rotation upon the excessive speed being attained. A ring 113 fixed to ball 53 is made of rubber and against it are adapted to bear the masses 9' of the centrifugal governor, the masses being suitably shaped so that they will entrain the ring 113 and the ball 53 in their rotation when the speed of the apparatus has reached the desired value.

Figure 6:
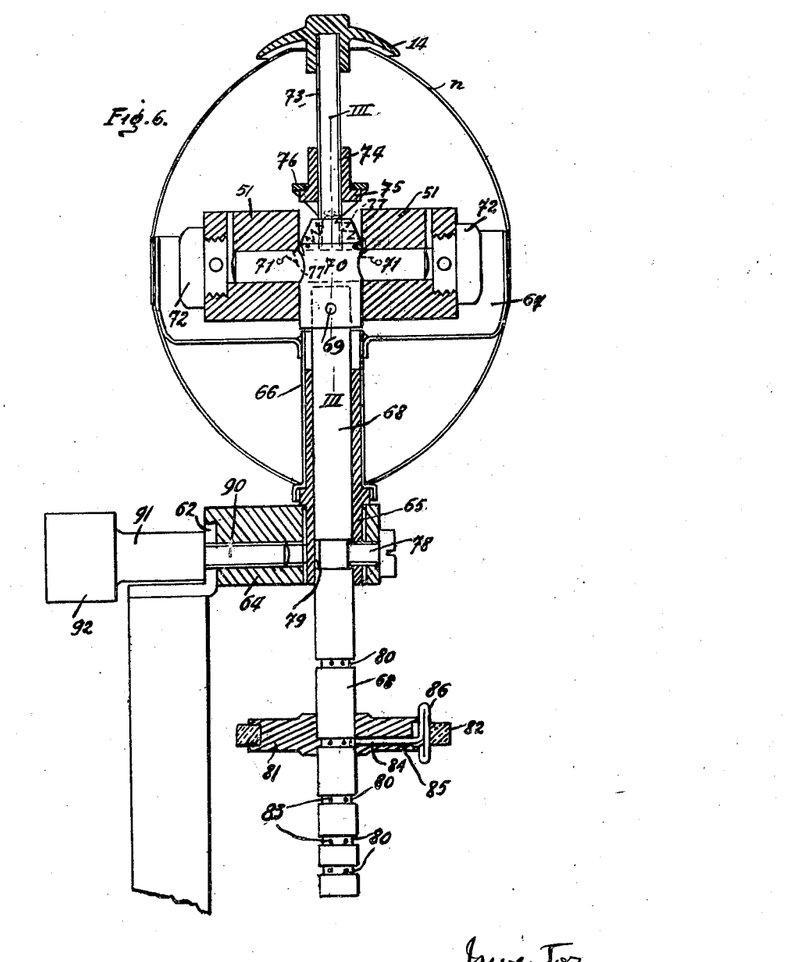
Fig. 6 is a sectional view on a larger scale of Fig. 5 taken along line II—II.

Or the rubber lining might be fitted to the outer ends of the masses of the centrifugal governor for contact with the inner surface of the ball as shown in Fig. 6, which will be described later.

The sixth object according to Figs. 1, 2 and 4 is realized by any of the following three methods: First, by means of the forewarning ball 53 actuated by a friction disc 54 keyed on the shaft 34 and by a friction wheel 55 bearing against disc 54. This ball, in the example shown, is driven according to the second method, that is, according to the method in which the ball is normally stationary and is entrained by the governor masses when the critical speed is exceeded. The critical speed can be adjusted by means of a nut 114 having screw thread engagement with the spindle 115 and bearing against a cap member 116 which in turn rests upon an extension 117 of the governor socket 118. The friction wheel 55 may be adjusted to various positions along spindle 115, thereby changing its position with relation to the centre of the friction disc 54. This adjustment will enable the ball to indicate an infinite number of different excessive speeds as can be readily understood. Second, the object may be realized by painting top 14 with two colors (black and white for instance), one color being applied to a very small part of the top (see Fig. 4) and the other color to the rest of the top. Third, this method consists in providing a very conspicuous spot 56 in the painting of the ball.

Figures 5, 7, 8, 9:
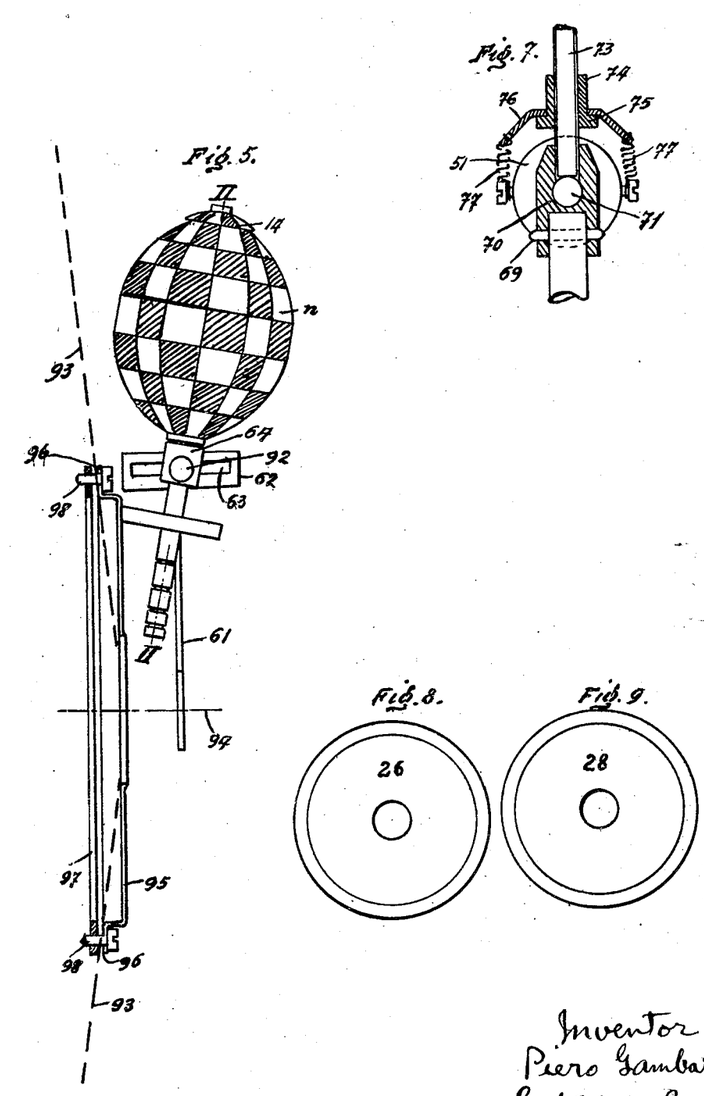
Fig. 5 is a diagrammatic view of an apparatus as applied to a bicycle and shows its supporting, connecting and driving means.
Fig. 7 is a sectional view on a larger scale of Fig. 6 taken along line III—III.
Figs. 8 and 9 each show one face of the friction wheel.

The seventh object is obtained by means of the alternative construction shown in Figs. 5, 6, 7, 8, 9, 13 and 14. In these figures, an arm 61, the bottom end of which is fixed at the level of the machine or vehicle wheel shaft, carries at its top a cross bar 62 having a longitudinal slot 63 (Fig. 5).

To the cross bar 62 a block 64 is secured in any suitable manner, for instance by a bolt 91 having a knurled head 92 and a screw-threaded portion 90 engaged in the correspondingly screw-threaded bore of the block 64. In the block 64 a second bore is provided for the reception of the lower end of a hollow support 65, the other end of which enters for a suitable distance into the hub 66 of a hollow ball $n$ carried by the support 65. The outside of the ball is painted with zones of different colors. Attached to the hub 66 is a cup 67, the peripheral wall of which receives the inner surface of the upper section of the ball $n$.

Inside the hollow support 65 is rotatably supported a shaft 68 projecting a small distance beyond the hub 66 of the ball —$n$—. The support 65 is fixed in place by means of a screw 78 passing through a wall of the block 64 and a wall of the hollow support 65 and engaging but not reaching the bottom of a peripheral groove 79 provided on the shaft 68. This arrangement also serves to hold in place the spindle 68.

The top end of the spindle 68 projects for a suitable distance into a block 70 in which it is secured by means of a pin 69. The block 70 is traversed by a cross pin 71, on the two projecting portions of which the two inertia masses 51—51 of the centrifugal governor are slidably mounted. The outer ends of the two masses are lined with soft material 72 (for instance, leather or rubber) serving to assist the said masses in entraining the ball —$n$— in their rotation under certain speed conditions.

In the top of the block 70 a spindle 73 is screwed, this spindle being screw-threaded over its whole length and traversing a sleeve 74 which is screw-threaded inside and merges into a flange 75 below. On the top face of the flange 75 rests a plate 76 bored to suit the outside diameter of the sleeve 74; to the symmetric ends of this plate the ends of a pair of helical springs 77 are attached, the opposite ends of the springs being attached to the sides of the masses 51—51 in a suitable position (Figure 7). When it is a question of the second signalling method the spring 77 between the plate 76 and the masses 51—51 serves to hold the masses away from the internal surface of the ball —$n$— as long as the apparatus is at rest, whereas when the apparatus is running spring 77 serves to oppose the shifting and sliding of the masses 51—51 which, against the action of said springs, will tend to move into contact with the ball —$n$— and to carry it along with them in their revolution as soon as the machine or vehicle velocity has attained the limit for which the said springs have been gauged and adjusted. The converse is the case when it is a question of the first signalling system, such as described in my Patent No. 1,596,345. By shifting the sleeve 74 along the spindle 73 the spring tension can be adjusted to cause the governor masses to engage the ball at any desired speed.

The top end of the spindle 73 projects to the outside of the ball $n$ through a large aperture formed in the ball top and carries a cap 14 painted, like the ball, with zones of different colors. The cap 14 revolves all the time the apparatus is running, no matter what be the velocity of the machine or vehicle and therewith the apparatus.

Along the lower portiton of the spindle 68 projecting below the block 64, peripheral grooves 80 are provided. On the spindle 68 a friction wheel 81 is adapted to slide, a ring 82 of electric material (for instance, rubber) being lodged in a peripheral groove of the wheel 81 in order to improve the friction contact between wheel 81 and friction disc 95 (shown in Fig. 5). Diametral holes 83 are formed in the spindle 68 in correspondence with the circular grooves 80. A pin 84 is inserted in a radial hole 85 of the wheel 81 and a diametral hole 83 to secure the wheel 81 in place on spindle 68. A head 86 is provided on pin 84 exceeding in length the thickness of wheel 81 and is lodged in a groove formed on the wheel's periphery and held in this groove by the pressure of the elastic ring 82.

With this arrangement the number of positions to which the friction wheel may be set along the spindle 68 is equal to the number of peripheral grooves 80, the latter number in turn being equal to the number of critical speeds to be controlled for a machine or vehicle wheel of a certain diameter. The same result can be achieved by means of a plurality of friction wheels of different diameters which can be selectively mounted upon the spindle.

Provisions might also be made, as shown in the example, for altering the position of the fundamental circle of the friction wheel 81 relative to each peripheral groove 80 in order that the apparatus may be capable of controlling these same determined peripheral speeds when used with vehicle or machine wheels of different diameters than the standard wheel for which the spacing of the grooves 80 has been calculated.

To this end the radial bore 85 in the friction wheel 81 is staggered relative to the centre plane of this wheel's peripheral groove. As a consequence, the wheel's fundamental circle may occupy two different positions relative to each groove 80 (and also relative to the centre of the friction disc) according as one or the other face of the friction wheel 81 is turned upward when this wheel is fixed in place. More than one radial hole 85 might also be provided in the wheel 81 (Figs. 13 and 14) and the wheel's fundamental circle would then occupy different positions relative to each groove 80 and thus the settings might be more numerous in order to suit different diameters of vehicle or machine wheels.

In the particular case shown in Fig. 5, when the wheel 81 is fixed on the spindle 68 with the radial hole 85 lying below the centre plane of the wheel, the apparatus is set to signal that any of the predetermined speeds (for instance 20—25—30—35—45 miles per hour with the five grooves 80 shown) has been attained by a vehicle fitted with 28″ wheels and on looking on the wheel 81 from above the number 28 may be read. If now the wheel 81 be reversed and fixed with the hole 85 lying above the centre plane of the wheel so that the number 26 be visible, the apparatus will be set for signalling any of those same five velocities in connection with a vehicle having 26 inch-wheels.

With reference to Figure 5, in which the erection and working of the indicating apparatus is diagrammatically shown in connection with a bicycle, the lines 93 represent the cycle wheel spokes and the dash-dotted line 94 the axle of the wheel; 61 is the arm supporting the speed control apparatus; 95 is the friction disc provided with a centre aperture for the wheel hub and axle and also provided with a flange 96 resting against the outer side of one set of wheel spokes; 97 is a ring or portions of a ring having the same radius as the flange 96 and resting against the inner side of the same set of spokes 93; 98 are screws clamping together the flange 96, the spoke set 93 and the ring or ring portions 97.

The diameter of the cycle wheel being known, in order to render the apparatus ready for work it will suffice to so place the friction wheel 81 on the spindle 68 that the wheel face bearing the number corresponding to the diameter of the cycle wheel is turned upwardly. After this the friction wheel should be fixed in the circular groove 80 corresponding to the velocity to be controlled. Finally by means of the knurled screw-nut 92 the block 64 should be adjusted so as to bring the friction wheel 81 in touch with the disc 95 and exert a slight pressure on the latter. The apparatus is now ready to indicate the desired speed.

It is obvious that by means of a suitable flexible control or other hand operated control it is possible to conveniently shift the friction wheel 81 along the spindle 68 and thus to operate the speed setting while the vehicle is running. The cross section of the spindle 68 may be different from the circular cross section shown.

I claim:

1. In a speed indicating apparatus, a rotatably mounted indicating body, rotatable means adapted to be driven by a moving part of a machine, means for automatically coupling and uncoupling said rotatable means to said indicating body, said last-named means being adapted to automatically change over from coupling to non-coupling position or vice-versa when said rotatable means passes a predetermined speed of rotation, and means for automatically locking said coupling means when said predetermined speed is exceeded.

2. In a speed indicating apparatus, a rotatably mounted indicating body, rotatable means adapted to be driven by a moving part of a machine, means for automatically coupling and uncoupling said rotatable means to said indicating body, said last-named means being adapted to automatically change over from coupling to non-coupling position or vice-versa when said rotatable means passes a predetermined speed of rotation, an electric light, a circuit and source of electric current for said light, a switch in said circuit, and means for automatically operating said switch when said predetermined speed is exceeded.

3. In a speed indicating apparatus, a rotatably mounted indicating body, rotatable means adapted to be driven by a moving part of a machine, means for automatically coupling and uncoupling said rotatable means to said indicating body, said last-named means being adapted to automatically change over from coupling to non-coupling position or vice-versa when said rotatable means passes a predetermined speed of rotation, and a change-speed mechanism adapted to vary the ratio between the speed of the machine and the speed of said rotatable means.

4. Apparatus according to claim 3 in combination with means for indicating the position of said change-speed mechanism, comprising a movable indicating member having sections of different colors, and connections between said change-speed mechanism and said indicating member whereby as the former is shifted the latter is also shifted.

5. Apparatus according to claim 3 in combination with means for indicating the position of said change-speed mechanism, comprising a movable indicating member having a plurality of windows of different colors, a source of light adapted to illuminate one of said windows at a time, and connections between said change-speed mechanism and said indicating member whereby as the former is shifted the latter is also shifted to bring another window into position to be illuminated by said source of light.

6. In a speed indicating apparatus, a rotatably mounted indicating body, rotatable means adapted to be driven by a moving part of a machine, a governor comprising inertia masses mounted upon said rotatable means, and coupling means of elastic material adapted to connect said inertia masses to said indicating body at certain speeds of rotation of said rotatable means.

7. In a speed indicating apparatus, a rotatably mounted indicating body, rotatable means adapted to be driven by a moving part of a machine, means for automatically coupling and uncoupling said rotatable means to said indicating body, said last-named means being adapted to automatically change over from coupling to non-coupling position or vice-versa when said rotatable means passes a predetermined speed of rotation, and means for indicating the approach of said predetermined speed comprising a second indicating body, driving means for the same adapted to be driven by a moving part of the machine, and coupling means for connecting or disconnecting said second indicating body and its driving means at a speed slightly below the speed for which said first mentioned indicating body is set.

8. In combination with a machine or vehicle wheel, a friction disk coaxially mounted on said wheel, a spindle rotatably mounted adjacent said friction disk, a friction wheel slidably mounted upon said spindle, means for securing said friction wheel to said spindle, said friction wheel being adapted to engage said friction disk, a rotatably mounted indicating body, and means for automatically coupling and uncoupling said spindle and said indicating body, said last-named means being adapted to automatically change over from coupling to non-coupling position or vice-versa when said spindle passes a predetermined speed of rotation.

9. In combination with a machine or vehicle wheel, a friction disk coaxially mounted upon said wheel, a spindle rotatably mounted adjacent said friction disk, a plurality of friction wheels of different diameters adapted to be selectively fixed upon said spindle, said spindle being adjustable with respect to said friction disk to permit the friction wheels of various diameters to be arranged in contact with said friction disk, a rotatably mounted indicating body, and means for automatically coupling and uncoupling said spindle and said indicating body, said last-named means being adapted to automatically change over from coupling to non-coupling position or vice-versa when said spindle passes a predetermined speed of rotation.

10. In combination with a machine or vehicle wheel, a friction disk coaxially mounted on said wheel, a spindle rotatably mounted adjacent said friction disk, a friction wheel slidably mounted upon said spindle, said spindle having a plurality of means for securing said friction wheel thereto arranged at definite distances from the center of said friction disk, means for varying the position of said friction wheel longitudinally of said spindle with respect to each of said last mentioned means, said friction wheel being adapted to engage said friction disk, a rotatably mounted indicating body, and means for automatically coupling and uncoupling said spindle and said indicating body, said coupling means being adapted to automatically change over from last-named to non-coupling position or vice-versa when said spindle passes a predetermined speed of rotation.

11. In a speed indicating apparatus, rotatable means adapted to be driven by a moving part of a machine, a counting mechanism, and means for automatically coupling said counting mechanism to said rotatable means when the latter has exceeded a predetermined speed of revolution.

Signed at Milan, Italy, this 16th day of November, 1926.

PIERO GAMBAROTTA.

CERTIFICATE OF CORRECTION.

Patent No. 1,724,468.  Granted August 13, 1929, to

PIERO GAMBAROTTA.

It is hereby certified that error appears in the printed specification of the above numbered patent requiring correction as follows: Page 8, line 95, claim 10, strike out the word "coupling" and insert instead the compound word "last-named", and line 97, same claim, strike out the compound word "last-named" and insert instead the word "coupling"; and that the said Letters Patent should be read with these corrections therein that the same may conform to the record of the case in the Patent Office.

Signed and sealed this 10th day of September, A. D. 1929.

(Seal)  
M. J. Moore,  
Acting Commissioner of Patents.